United States Patent
Dayama et al.

(10) Patent No.: US 10,651,784 B2
(45) Date of Patent: May 12, 2020

(54) SOLAR FARMING WITH MOBILE PHOTONIC HARVESTERS

(71) Applicant: International Business Machines Corporation, Armonk, NY (US)

(72) Inventors: Pankaj Dayama, Bangalore (IN); Shivkumar Kalyanaraman, Bangalore (IN); Sukanya Randhawa, Bangalore (IN); Nitin Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 15/445,043

(22) Filed: Feb. 28, 2017

(65) Prior Publication Data

US 2018/0248509 A1  Aug. 30, 2018

(51) Int. Cl.
*H02S 40/22* (2014.01)
*H02S 40/10* (2014.01)
(Continued)

(52) U.S. Cl.
CPC .............. *H02S 40/22* (2014.12); *H02S 20/32* (2014.12); *H02S 40/10* (2014.12); *H02S 40/425* (2014.12); *H02S 50/00* (2013.01); *Y02E 10/52* (2013.01)

(58) Field of Classification Search
None
See application file for complete search history.

(56) References Cited

U.S. PATENT DOCUMENTS

| 5,108,218 A | 4/1992 | Wyckoff |
| 6,017,002 A | 1/2000 | Burke et al. |

(Continued)

FOREIGN PATENT DOCUMENTS

| DE | 102008009477 A1 | 8/2008 |
| IN | 2956CHE2012 A | 4/2016 |

(Continued)

OTHER PUBLICATIONS

Hollick, J., "PV Thermal Systems—Capturing the Untapped Energy," In Proceedings of the Solar Conference (vol. 1, p. 285). 2007.

(Continued)

*Primary Examiner* — Shannon M Gardner
(74) *Attorney, Agent, or Firm* — Ryan, Mason & Lewis, LLP

(57) ABSTRACT

Methods and systems for cost-effective precision solar farming with mobile photonic harvesters are provided herein. An example computer-implemented method includes automatically determining, for each of multiple solar photovoltaic modules within a system, the angle of captured solar radiation with respect to the surface of the solar photovoltaic module, wherein the system comprises (i) the multiple solar photovoltaic modules and (ii) multiple moveable reflective surfaces used in conjunction with at least some of the multiple solar photovoltaic modules; automatically detaching one or more of the reflective surfaces from one or more respective first positions within the system based on the determined angles of captured solar radiation; and automatically attaching the one or more detached reflective surfaces to one or more respective second positions within the system based on the determined angles of captured solar radiation, such that the amount of solar radiation captured by the solar photovoltaic module is increased.

13 Claims, 14 Drawing Sheets

(51) Int. Cl.
  *H02S 20/32* (2014.01)
  *H02S 40/42* (2014.01)
  *H02S 50/00* (2014.01)

(56) References Cited

U.S. PATENT DOCUMENTS

| | | | |
|---|---|---|---|
| 8,655,497 | B2 | 2/2014 | Campanile et al. |
| 2004/0025931 | A1 | 2/2004 | Aguglia |
| 2009/0151769 | A1 | 6/2009 | Corbin |
| 2009/0283135 | A1* | 11/2009 | Neeb .................. H02S 40/38 136/246 |
| 2010/0057267 | A1 | 3/2010 | Liu |
| 2010/0170561 | A1 | 7/2010 | Peng |
| 2011/0197943 | A1 | 8/2011 | Pleva |
| 2012/0160234 | A1* | 6/2012 | Wares .................. H01L 31/0525 126/684 |
| 2012/0325288 | A1 | 12/2012 | Jang et al. |
| 2013/0328090 | A1 | 12/2013 | Park |
| 2014/0094980 | A1 | 4/2014 | Saito |
| 2014/0238465 | A1 | 8/2014 | Kos et al. |
| 2014/0373900 | A1 | 12/2014 | Lamkin et al. |
| 2015/0155414 | A1 | 6/2015 | Bedell |
| 2016/0056320 | A1 | 2/2016 | Chang |
| 2016/0087132 | A1 | 3/2016 | Alteneiji |

FOREIGN PATENT DOCUMENTS

| | | |
|---|---|---|
| WO | 2010003115 A1 | 1/2010 |
| WO | 2015122891 A1 | 8/2015 |

OTHER PUBLICATIONS

Hosseini et al., "An experimental study of combining a photovoltaic system with a heating system." In World renewable energy congress, vol. 8, pp. 2993-3000. 2011.

Lin et al., "Non-tracked mirror-augmented photovoltaic design and performance." In Photovoltaic Specialists Conference (PVSC), 2012 38th IEEE, pp. 002076-002081 IEEE, 2012.

Moharram et al., "Enhancing the performance of photovoltaic panels by water cooling." Ain Shams Engineering Journal 4, No. 4 (2013): 869-877.

Karami et al., "Heat transfer enhancement in a hybrid microchannel-photovoltaic cell using Boehmite nanofluid." International Communications in Heat and Mass Transfer 55 (2014): 45-52.

Zhu et al., Stress-dependent molecular pathways of silica-water reaction, Journal of the Mechanics and Physics of solids, 53 (2005) 1597-1623.

Armstrong et al., "A thermal model for photovoltaic panels under varying atmospheric conditions." Applied Thermal Engineering 30, No. 11 (2010): 1488-1495.

Wikipedia, Reflectance, https://en.wikipedia.org/wiki/Reflectance, 2015.

Nalamwar, A., NESPAL Air Water Heater, Mar. 1, 2015.

Wikipedia, Concentrator Photovoltaics, Oct. 5, 2016, pp. 1-11. http://en.wikipedia.org/wiki/Concentrated_photovoltaics#Concentrated_photovoltaics_and_thermal.

Wikipedia, Diffuse Reflection, Oct. 5, 2016, pp. 1-4, http://en.wikipedia.org/wiki/Diffuse_reflection.

Wikipedia, Optical Coating, Oct. 5, 2016, pp. 1-5, http://en.wikipedia.org/wiki/Optical_coating.

Wikipedia, Perfect Mirror, Oct. 5, 2016, pp. 1-2, http://en.wikipedia.org/wiki/Perfect_mirror.

Woodford, Heat-Reflecting Low-E Glass, Jul. 10, 2016, pp. 1-10, http://www.explainthatstuff.com/how-low-e-heat-reflective-windows-work.html.

KentOptronics, Liquid Crystal for Photonics, Switchable Mirror, Switchable Glass, pp. 1-2, Oct. 5, 2016, http://www.kentoptronics.com/mirror.html.

Wikipedia, Light Tube, Oct. 5, 2015, pp. 1-8, http://en.wikipedia.org/wiki/Light_tube.

Orientation & Zoning of Buildings to Reduce Solar Gain: Rio de Janeiro, Oct. 5, 2016, pp. 1-5, http://www.riorenewables.com/efficient-design/orientation-zoning.

PlanetEnergy.co.uk, Sales Inquiry, 2015, pp. 1, http://www.planetenergy.co.uk/Solar%20Vacuum%20v%20Flat%20Collector%20Comparison.pdf.

Solar Radiation Control Coatings Tested at ORNL User Center, Sep. 9, 1996, pp. 1-3, http://web.ornl.gov/sci/roofs+walls/facts/SolarRadiationControl.htm.

Wikipedia, Concentrator Photovoltaics, Oct. 5, 2016, pp. 1-11, http://en.wikipedia.org/wiki/Concentrated_photovoltaics.

How to Boost any Solar Panel Output by 75%, 2014, pp. 1-20, http://geo-dome.co.uk/article.asp?uname=solar_mirror.

\* cited by examiner

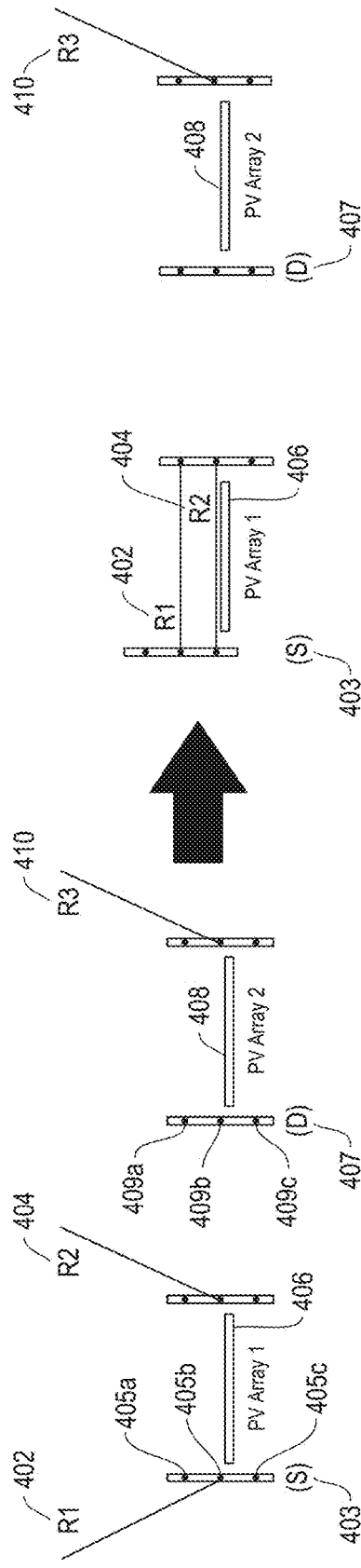
FIG. 4A
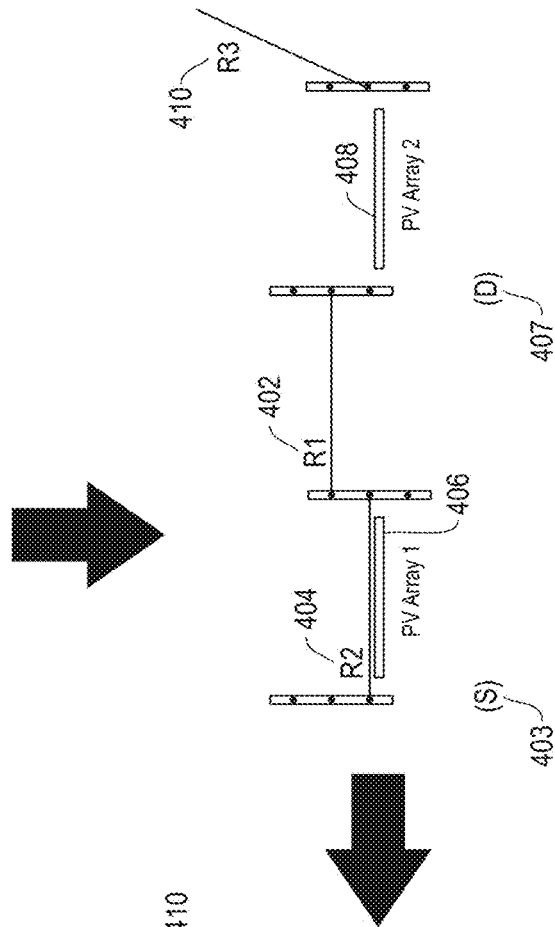
FIG. 4B
FIG. 4C
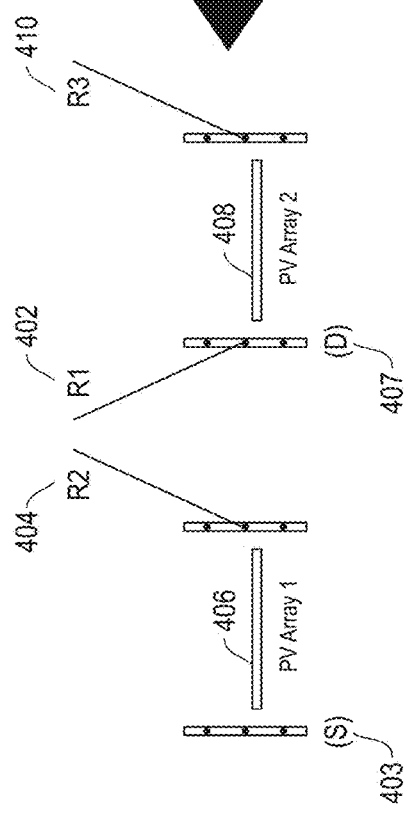
FIG. 4D

SOLAR FARMING WITH MOBILE PHOTONIC HARVESTERS

FIELD

The present application generally relates to information technology (IT), and, more particularly, to renewable energy technology.

BACKGROUND

The use of photonic harvesters can increase production of commodity solar panels. However, implementation of such technology commonly requires substantial costs and computational capabilities, and can result in vulnerability to disadvantageous side effects, such as overheating and debris coverage.

SUMMARY

In one embodiment of the present invention, techniques for cost-effective precision solar farming with mobile photonic harvesters are provided. An exemplary computer-implemented method can include automatically determining, for each of multiple solar photovoltaic modules within a system, the angle of captured solar radiation with respect to the surface of the solar photovoltaic module, wherein the system comprises (i) the multiple solar photovoltaic modules and (ii) multiple moveable reflective surfaces used in conjunction with at least some of the multiple solar photovoltaic modules. Such a method can also include automatically detaching one or more of the reflective surfaces from one or more respective first positions within the system based on the determined angles of captured solar radiation, and automatically attaching the one or more detached reflective surfaces to one or more respective second positions within the system based on the determined angles of captured solar radiation, such that the amount of solar radiation captured by the solar photovoltaic module is increased as a result of said detaching and said attaching.

In another embodiment of the invention, an exemplary computer-implemented method can include generating, for a given system of multiple solar photovoltaic modules, a prediction model with respect to (i) overheating of solar photovoltaic module surfaces and (ii) debris coverage of solar photovoltaic module surfaces, wherein the prediction model is based on differential performance of multiple solar photovoltaic modules from one or more systems. Such a method can also include analyzing one or more items of multi-modal data to determine the current status of one or more variables related to (i) overheating of one or more solar photovoltaic module surfaces within the given system and (ii) debris coverage of one or more solar photovoltaic module surfaces within the given system. Further, such a method can include automatically activating one or more solar photovoltaic module surface maintenance devices to perform one or more maintenance operations to the surface of one or more of the solar photovoltaic modules within the given system based on (i) the generated prediction model and (ii) the determined current status of the one or more variables.

In yet another embodiment of the invention, a system can include a plurality of solar photovoltaic modules, and a plurality of moveable reflective surfaces that (i) collect solar radiation and (ii) distribute the collected solar radiation across one or more portions of the plurality of solar photovoltaic modules, wherein each one of the plurality of moveable reflective surfaces is physically connected to at least one of the solar photovoltaic modules. Such a system can also include a controller, wherein the controller comprises at least a memory and a processor coupled to the memory, and wherein the controller: automatically determines, for each of the solar photovoltaic modules, the angle of the collected solar radiation with respect to the surface of the solar photovoltaic module; generates instructions for automatically detaching one or more of the reflective surfaces from one or more respective first positions based on the determined angles of collected solar radiation; and generates instructions for automatically attaching the one or more detached reflective surfaces to one or more respective second positions based on the determined angles of captured solar radiation, such that the amount of solar radiation captured by the solar photovoltaic module is increased as a result of said detaching and said attaching.

Additionally, in another embodiment of the invention, a system can also include one or more air blowers, wherein each one of the air blowers is positioned proximate to the plurality of solar photovoltaic modules, and one or more fluid sprinklers, wherein each one of the fluid sprinklers is positioned proximate to the plurality of solar photovoltaic modules. Such a system also includes a controller, wherein the controller comprises at least a memory and a processor coupled to the memory, and wherein the controller: automatically activates the one or more air blowers to perform one or more maintenance operations to the surface of one or more of the solar photovoltaic modules at one or more determined temporal instances based on (i) a generated prediction model and (ii) a determined current status of the one or more variables; and automatically activates the one or more fluid sprinklers to perform one or more maintenance operations to the surface of one or more of the solar photovoltaic modules at one or more determined temporal instances based on (a) a prediction model with respect to (i) overheating of solar photovoltaic module surfaces and (ii) debris coverage of solar photovoltaic module surfaces, and (b) a current status of one or more variables related to (i) surface overheating of one or more of the solar photovoltaic modules and (ii) debris coverage of one or more of the solar photovoltaic modules.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4A, FIG. 4B, FIG. 4C and FIG. 4D are diagrams illustrating dynamic detachment and attachment of reflectors, according to an exemplary embodiment of the invention;

DETAILED DESCRIPTION

As described herein, an embodiment of the present invention includes cost-effective precision solar farming with mobile photonic harvesters. At least one embodiment of the invention includes using analytics to efficiently control the operations and maintenance of Internet of Things (IoT) integrated photonic reflective surfaces (also referred to herein as reflectors or mirrors) and solar photovoltaic (PV) modules to reduce the levelized cost of energy (LCOE) of solar PV systems. As described herein, such an embodiment can include dynamically detaching and attaching reflectors in one or more directions and to one or more different modules with respect to parameters such as sun angle, target solar PV profile, estimated dust and/or shadowing impacts, overheating of modules, detected performance anomalies in similar modules, etc.

By dynamically detaching and attaching reflectors in different directions to different modules, at least one embodiment of the invention can include grouping and/or packing more modules in given system (also referred to as a solar farm) area as well as improving the yield of such a system. In such an embodiment, dynamic detaching and attaching of reflectors can be based on analysis of one or more system attributes and various environmental conditions (as noted above and further detailed herein) derived from multi-modal data inputs (such as, for example, data derived from supervisory control and data acquisition (SCADA), infrared (IR) cameras).

Additionally, at least one embodiment of the invention includes utilizing an IoT integrated system for automated maintenance of solar farms by selectively activating air-jets and/or water sprinklers based on analysis of multi-modal inputs (such as from SCADA analytics, IR cameras, etc.). Such an embodiment can be implemented, for example, to remove debris (such as dirt or dust) from one or more PV module/panel surfaces, as well as to reduce the temperature of one or more PV module/panel surfaces.

One or more embodiments of the invention can also include estimating debris/dust particle coverage and/or the level of concentrated overheating on one or more PV module/panel surfaces. Such estimations can subsequently be used, for example, for optimized operation and/or selective activation of water sprinklers and/or air blowers used in conjunction with the one or more PV modules.

As further detailed herein, one or more embodiments of the invention can include dynamically controlling one or more reflectors (such as mirrors, for example) within a solar farm or PV module system. Such control can include dynamically detaching and attaching one or more reflectors across one or more PV modules based on analysis of multi-modal data, sun-position and one or more constraints.

Figure 3:
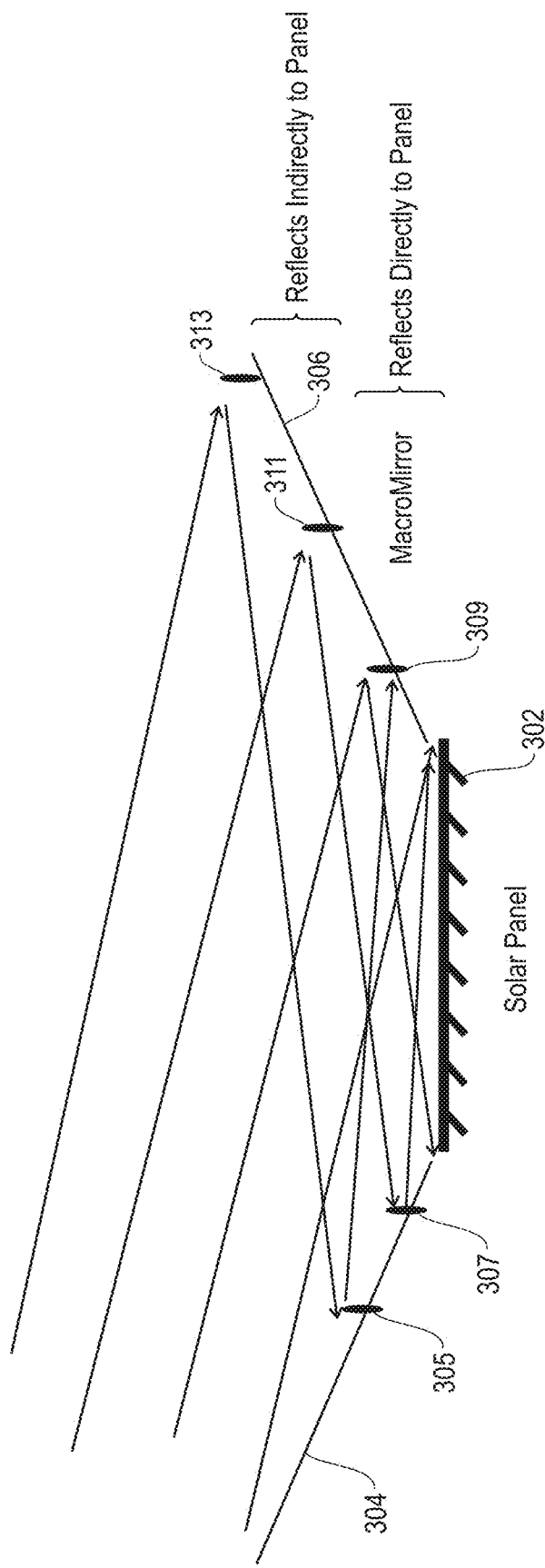
FIG. 3 is a diagram illustrating a system that includes fixed macro-mirrors and/or micro-mirrors, according to an exemplary embodiment of the invention.

Additionally, as used herein in connection with one or more embodiments of the invention, reflectors can include flat mirrors, concave mirrors, and/or convex mirrors. Concave mirrors can be similar to convex lenses (while concave mirrors can be used to minimize absorption), and concave mirrors bend light towards the principal axis. Also, a semi-concave mirror can include a concave portion on the top half of the mirror. Further, at least one embodiment of the invention (such as depicted in FIG. 3, for example) can include implementing a reflector with multiple reflective surfaces (that is, one or more micro-reflectors and one or more macro-reflectors).

Figure 1A:
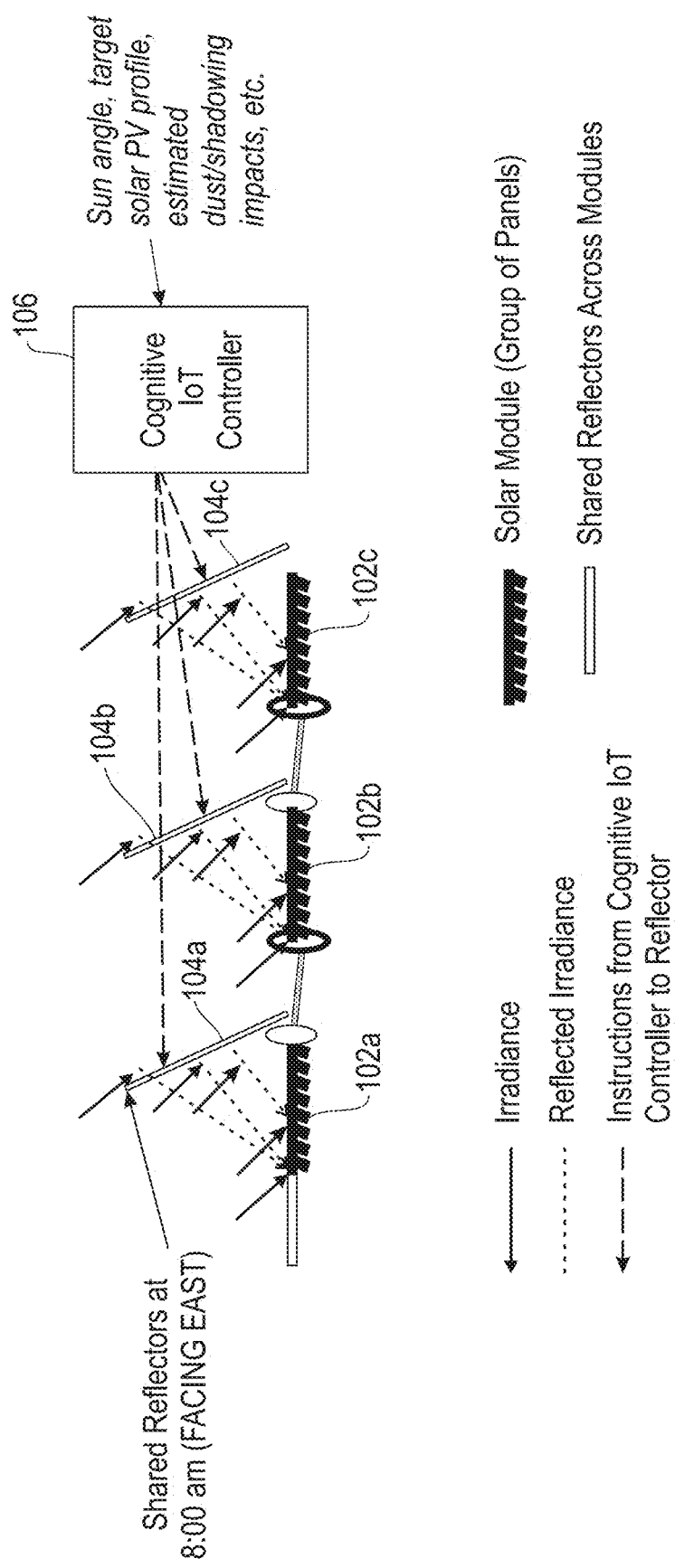
FIG. 1A and FIG. 1B are diagrams illustrating dynamic detachment and attachment of reflectors, according to an exemplary embodiment of the invention.
Figure 1B:
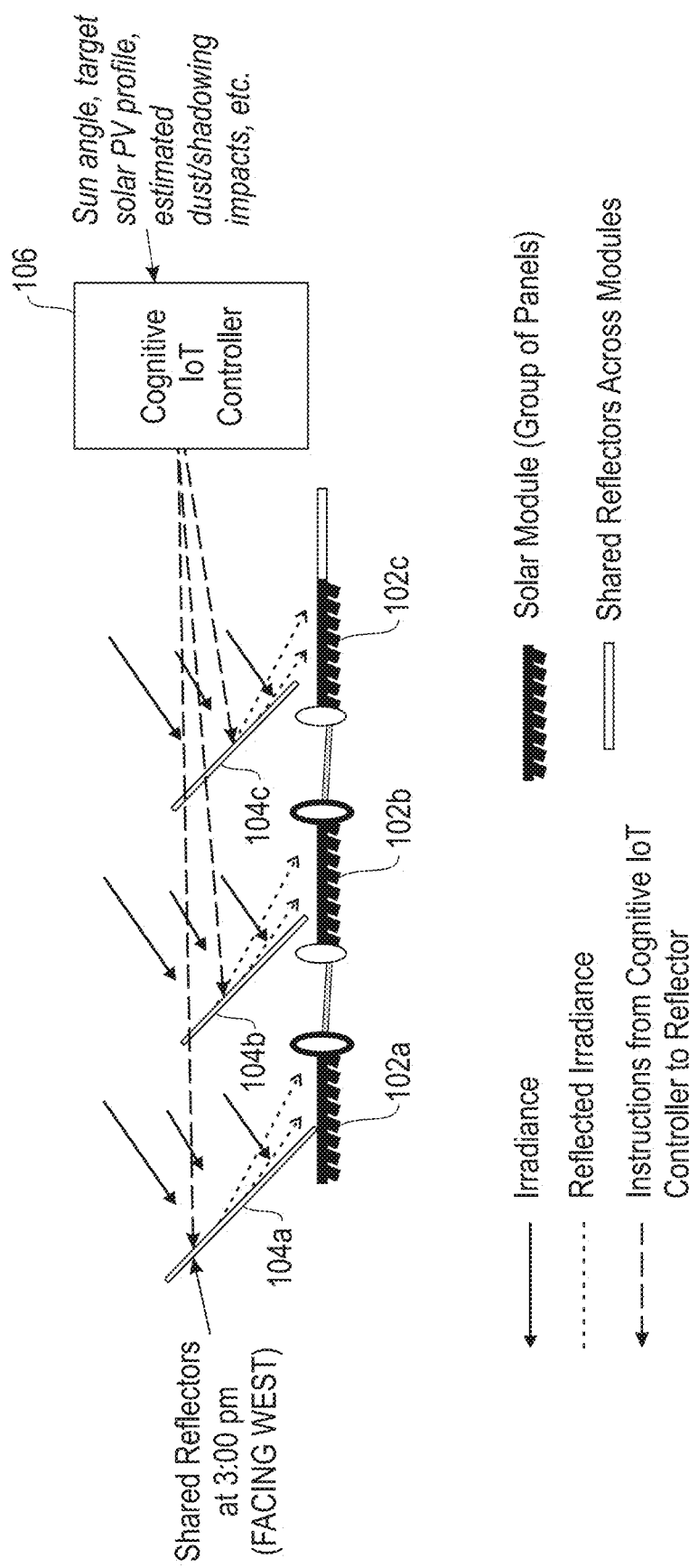

FIG. 1A and FIG. 1B are diagrams illustrating dynamic detachment and attachment of reflectors, according to an exemplary embodiment of the invention. By way of illustration, FIG. 1A depicts shared reflector placement at 8:00 AM (facing East), while FIG. 1B depicts shared reflector placement at 3:00 PM (facing West). Specifically, FIG. 1A and FIG. 1B depict PV modules 102a, 102b and 102c, shared reflectors 104a, 104b and 104c, and a cognitive IoT controller 106. As illustrated, the same reflector can be attached to different PV modules based on instructions provided by the cognitive IoT controller 106. As described further herein, such instructions can dynamically match a reflector (such as 104a, 104b, and/or 104c) to a PV module (such as 102a, 102b, and/or 102c) based on observed data, constraints, etc., with a goal of improving overall yield of the system/solar farm.

As depicted in FIG. 1A and FIG. 1B, the cognitive IoT controller 106 can receive inputs such as, for the example, sun angle/position, weather forecasts, SCADA data, images from IR cameras, the number and current positioning of reflectors within the system, the number of modules within the system, and costs associated with repositioning one or more reflectors. Such costs can be related to one or more mechanisms required for moving and rotating the reflectors (for example, fixed and operating costs for motors, hydraulic mechanism, etc.). Based on the analysis of such inputs, the cognitive IoT controller 106 can generate a new configuration of reflectors 104a, 104b, and 104c, and output instructions to effectuate the corresponding detaching and attaching operations.

One or more embodiments of the invention can include a local automatic controller (physically implemented in conjunction with the solar panels), and the instructions for controlling the local automatic controller can be provided by a remote IT cloud location (such as, for example, cognitive IoT controller 106). Such a control system can be realized as one or more algorithms on the IT cloud, driven by machine-learning models of different phenomena (for example, normal performance, dust and/or shadowing, cloudy conditions, voltage-current-irradiance tradeoffs, azimuth or variance-of-irradiance modeling, etc.). Multi-modal data generated from solar panels, thermal sensors, IR camera, etc. can be transmitted through a local wireless interface to the IT cloud, and based on ground measurements (multi-modal data), the reflector controller will periodically (for example, once every minute) determine the mapping of the reflector to the solar panel as well as the optimal reflector angle. Additionally, such a controller (106) can send the control signal to the local automatic controller at the solar panel(s). Also, a backup local control strategy can be implemented in case of persistent unreliable internet connectivity.

At least one embodiment of the invention can include implementing a mixed-integer linear programming (MILP) optimization model to select a configuration that maximizes the yield of the system/solar farm, taking into account the cost of repositioning the reflectors as well as the cost of maintaining the PV modules and reflectors. The cost of repositioning the reflectors can depend on the total movement of the reflectors from a current arrangement to a new configuration. Additionally, the yield can also depend on the current state of the PV modules (with respect to dust/debris coverage, surface temperature, etc.) and the total irradiance (also referred to as solar radiation, which can include direct solar radiation and diffuse solar radiation) falling on the PV modules.

Figure 2:
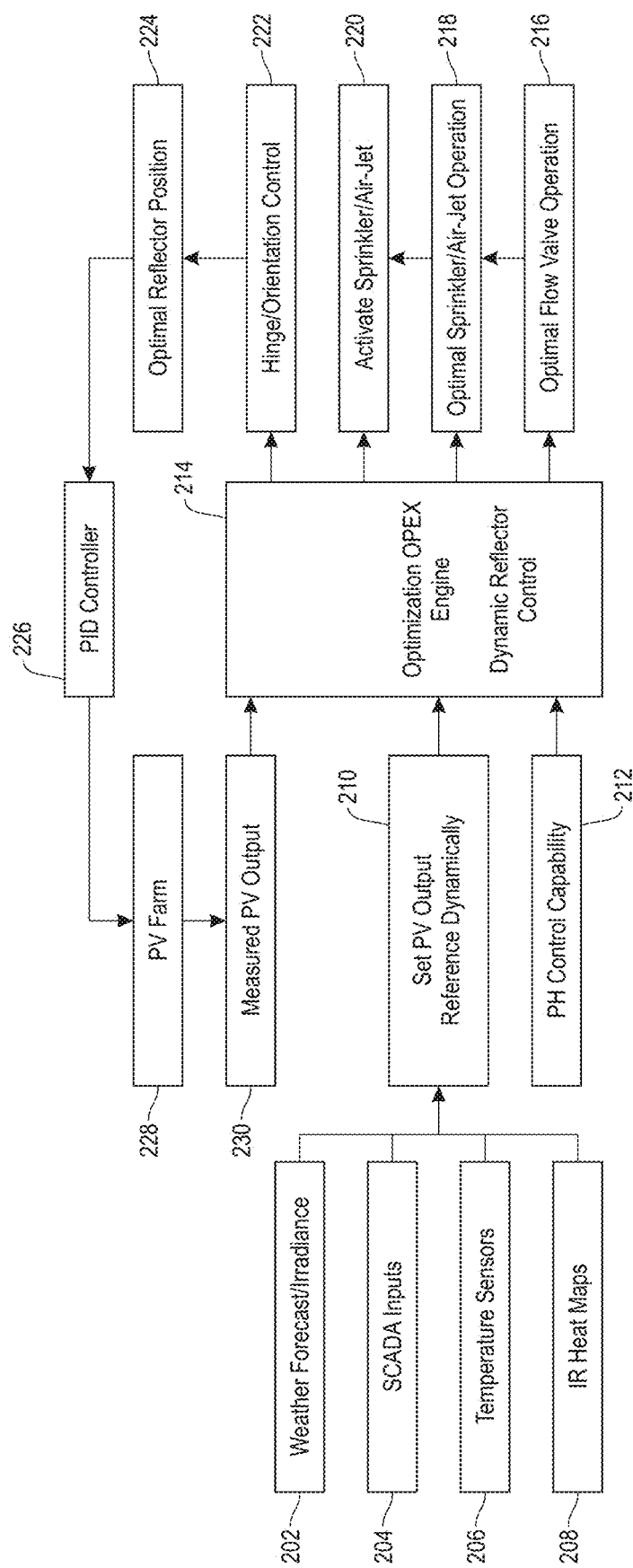
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts an IoT-integrated system for activating air-jets and water sprinklers. In one or more embodiments of the invention, the actual placement of the water sprinklers and/or air jets is flexible and can be anywhere in a PV system depending on the system type, geometry, etc. For example, placement can be on the side of the system to cover both the top and the bottom of the PV panel(s), on top of the system to cover mostly the top of the PV panel(s), and/or on the bottom of the system to cover mostly the bottom of the PV panel(s).

As illustrated in FIG. 2, inputs such as weather forecasts and/or irradiance data 202, SCADA inputs 204, temperature sensor data 206, and images from IR cameras and/or heat maps 208 can be provided to component 210 and used to dynamically set a PV output reference. PV output reference, as used herein, refers to the expected PV output. The expected PV output for a given system, for particular type of reflectors used, can be estimated for a given time based on various inputs such as weather/irradiance forecast data, temperature inputs, type of reflectors used, etc. The PV output reference as well as pH control capability 212 can then be provided to an optimization (operating expenses) engine 214, which uses provided inputs to dynamically control the reflectors and the air-jets (also referred to herein as air blowers) and water sprinklers of the system/solar farm. PH control capability refers to the tuning range of PV output power possible at a given time by adjusting the amount of irradiance, with the help of reflector angle settings. Having this range can serve as a control knob for tuning power, if required, to balance grid interactions, to balance one part of the PV system against another part of the PV system for more stable output during cleaning and/or cooling operations, and/or to smooth the output.

By way of example, at time t, the optimization engine 214 analyzes the provided weather data 202, SCADA data 204, temperature data 206, and IR images 208 to identify dust particles on one or more of the PV modules of the system, concentrated heating zones on one or more of the PV modules of the system, and wind speeds and forecast of rains over a subsequent predetermined period of time (for instances, in the next few hours). Based on the analysis, the optimization engine 214 will selectively activate one or more air-jets and one or more water sprinklers for cleaning and/or cooling one or more of the PV modules.

As depicted in FIG. 2, the optimization engine 214 can output optimized values for a flow valve operation 216, an optimal sprinkler and/or air-jet operation 218, and instructions 220 to activate one or more sprinklers and/or one or more air-jets based on the optimal operation(s) 218. The above-noted flow valve operation refers to the optimal operation of flow valves in the context of cooling canals, wherein the height of the water (or volume) therein can be adjusted via the inlet/outlet valves such as to allow efficient circulation of water between different strings. Such optimized values output by the optimization engine 214 can be used to ensure adequate and precise operating conditions (such as, for example, how many air jets and/or water sprinklers need to be activated, which ones specifically need to be activated, and for how long).

Further, the optimization engine 214 can output reflector hinge and/or orientation control instructions 222, which can be used to generate instructions 224 for optimal reflector positioning. Such instructions 224 can then be provided to a proportional-integral-derivative (PID) controller 226, which generates and outputs instructions to the PV system/solar farm 228, which subsequently measures the resulting PV output 230 and provides such measured output to the optimization engine 214. The PID controller 226 can take inputs regarding optimal mirror angular settings for different times, and communicate these values to the hydraulic controls. Additionally, the PID controller 226 can obtain feedback from such controls until the correct angular setting is achieved. Such a mechanism can be repeated for different parts of the solar farm.

Additionally, at least one embodiment of the invention can include facilitating optimal operation of water sprinklers and air-jets based on relative performance of one or more PV modules. Based on inputs including SCADA data for different PV modules/panels, and weather forecasts, such an embodiment can include determining and outputting on/off time instructions for different sprinklers and/or air-jets used in conjunction with the system/solar farm in question. One or more embodiments of the invention can include grouping or clustering similar PV modules in the system/solar farm based on the PV module's position relative to other modules. Such an embodiment also includes comparing the relative performance of modules in the same cluster to identify or flag low-performing modules. Further, data captured by IR cameras can be used in conjunction with such comparison data to identify dust/debris coverage and/or overheating of given modules. Also, the weather forecast inputs can be utilized to aid in the decision whether to selectively operate particular sprinklers and/or air-jets.

FIG. 3 is a diagram illustrating a system that includes fixed macro-mirrors and/or micro-mirrors, according to an exemplary embodiment of the invention. By way of illustration, FIG. 3 depicts solar panel 302, macro-mirror 304, macro-mirror 306, and micro-mirrors 305, 307, 309, 311 and 313. Macro-mirror 304 and/or macro-mirror 306 can, for example, be ceramic (that is, a diffuse reflector) with a high frequency of fixed micro-mirrors (such as 305, 307, 309, 311 and 313). Such an arrangement can include a trade-off between losing a fraction of light and guaranteeing harvesting.

Additionally, at least one embodiment of the invention can include a system that includes fixed macro-mirrors, fixed micro-mirrors, and fixed end mirrors. Such a system can be used, for example, for heat and illumination harvesting, utilizing multiple reflections. For example, during mid-day, lesser amounts of light can be reflected to the solar panel (also, the absorption of heat at mid-day can be tuned or an internal light guide can be utilized to couple the light back to the solar panel). Such an embodiment can also include using double-sided micro-mirrors, wherein such mirrors include a right angle to ground (for example, for illumination harvesting). In an example embodiment of the invention, fixed macro-mirrors can be implemented at an angle of between 5° and 15° (relative to the panel) to allow harvesting of a maximal area size, while fix micro-mirror strips can be implemented at an angle of 90° relative to the fixed macro-mirrors (to ensure vertical light).

Also, at least one embodiment of the invention can include a system that includes macro-mirrors with micro-hemispheres, as well as end mirrors (that can be concave or flat). Further, in at least one embodiment of the invention, macro-reflectors (or macro-mirrors) can be utilized to amortize the cost of operating multiple reflectors. Such macro (or large) reflectors that cover a block of solar panel rows can, for example, be any of the reflector designs (simple or complex designs) detailed herein.

FIG. 4A, FIG. 4B, FIG. 4C and FIG. 4C are diagrams illustrating dynamic detachment and attachment of reflectors, according to an exemplary embodiment of the invention. By way of illustration, FIG. 4A depicts a starting configuration, FIG. 4B depicts a second configuration (subsequent to the FIG. 4A configuration), FIG. 4C depicts a third configuration (subsequent to the FIG. 4B configuration), and FIG. 4D depicts a final configuration (subsequent to the FIG. 4C configuration).

Specifically, in FIG. 4A, reflectors 402 and 404 are each hinged (or attached) to a distinct column of clamp S 403 as part of PV array 406, while reflector 410 is hinged to one column of clamp D 407 as part of PV array 408. Note also that there are multiple (height-adjustable shaft) positions 405a, 405b and 405c on clamp 403 on each side of PV array 406, and also multiple (height-adjustable shaft) positions 409a, 409b and 409c on clamp 407 on each side of PV array 408. In FIG. 4B, reflectors 402 and 404 are hinged (or attached) to both columns of clamp S 403 as part of PV array 406, while reflector 410 is hinged to one column of clamp D 407 as part of PV array 408. In FIG. 4C, reflector 402 is hinged (or attached) to one column of clamp S 403 and one column of clamp D 407, reflector 404 is hinged to both columns of clamp S 403, and reflector 410 is hinged to one column of clamp D 407. Additionally, in FIG. 4D, reflector 402 is hinged (or attached) to one column of clamp D 407, reflector 404 is hinged to one column of clamp S 403, and reflector 410 is hinged to one column of clamp D 407.

Accordingly, in one or more embodiments of the invention, reflectors can also be moved along the column/shaft, for example, by moving a reflector for the same PV array along a hinge axis. Also, it is to be appreciated that the mechanisms for detaching and attaching reflectors detailed above and depicted in FIG. 4A-FIG. 4D are merely example mechanisms, and one or more additional mechanisms can be utilized and/or implemented by embodiments of the invention.

Figure 5:
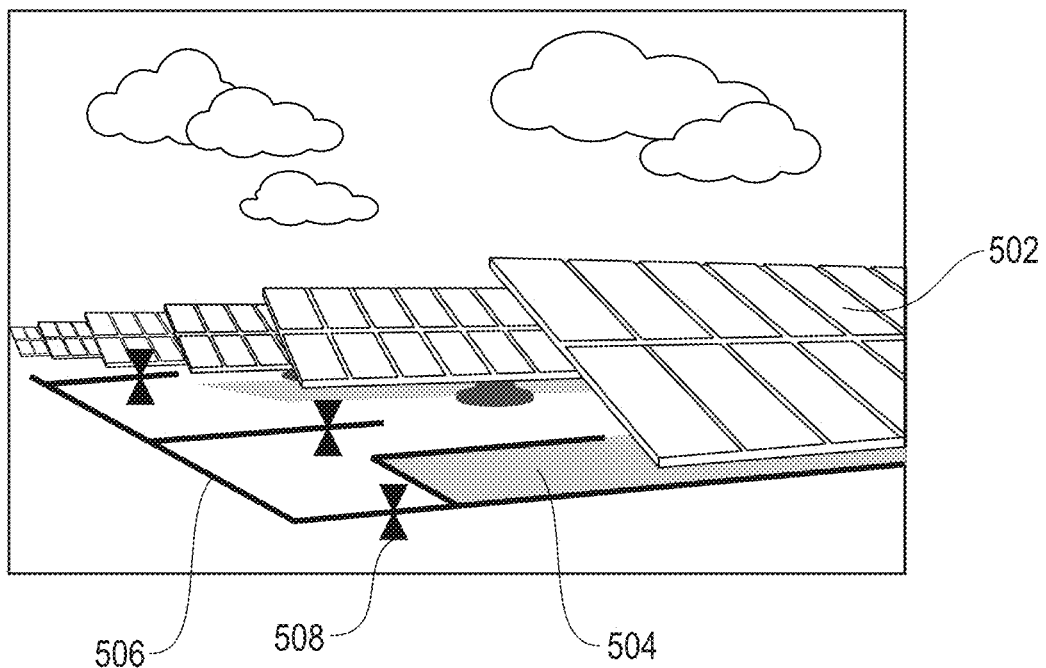
FIG. 5 is a diagram illustrating system architecture, according to an exemplary embodiment of the invention.

At least one embodiment of the invention can also include managing PV module cooling via optimal water harvesting. FIG. 5 is a diagram illustrating system architecture, according to an exemplary embodiment of the invention. By way of illustration, FIG. 5 depicts a solar panel 502 as well as a water canal 504 implemented approximate thereto. Additionally, FIG. 5 depicts a conduit system 506 (for transmitting water to and from the water canals) and input/output valves 508 (for controlling the flow and/or amount of water into and out of the water canals).

In an embodiment such as depicted in FIG. 5, one or more water canals 504 can be constructed below PV module/panel rows 502 to help in temperature maintenance and/or cooling of panels (for example, as additional irradiance is directed onto the panels via reflectors). Different levels of water (in the canals) can be monitored by controlling the water flow through input valves 508 respectively configured for different levels of cooling. Efficient temperature control can be carried out, for example, by providing a heat sink targeted at the back of a p-si panel. As used herein, a p-si panel refers to an example type of solar panel, namely, a polycrystalline-silicon based panel. It should be noted, however, that the mechanisms and techniques described herein can be implemented with any type of solar panel. Further, in such an embodiment, rain water harvesting techniques can be utilized in conjunction for additional water leveraging.

Based on inputs such as SCADA inputs, temperature sensor data, IR images, weather forecasts, and water level sensor data, one or more embodiments of the invention can include determining and outputting instructions for opening and/or closing select water inlet valves to add and/or stop water flow to one or more PV modules. By way of example, at a given time, such an embodiment can include analyzing temperature data from sensors, production data from the PV modules, thermal maps using IR cameras to identify concentrated heating zones on the panel, wind speeds and forecasts of rain with a subsequent predetermined period of time, and water levels in the cooling canals. Based on the analysis, an IoT controller (such as, for example, component 106 in FIG. 1) can selectively activate input valves for releasing water for a certain period of time until a certain water level is achieved, to reduce the temperature and maintain panel performance of one or more particular PV modules/panels.

Figure 6:
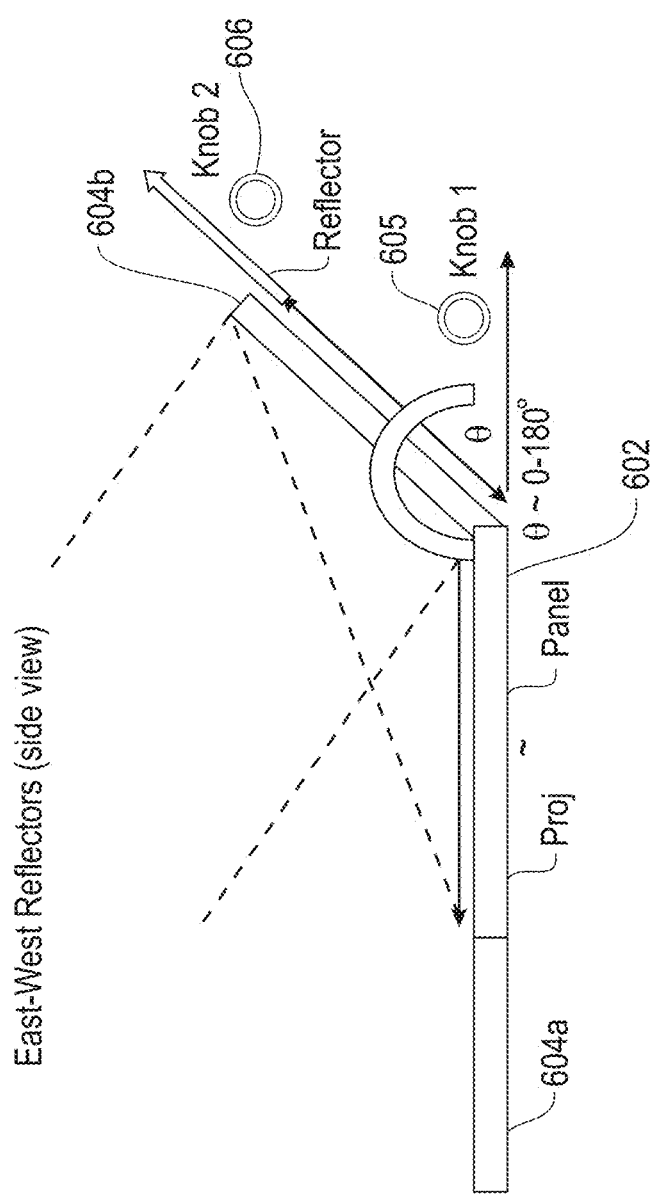
FIG. 6 is a diagram illustrating a system that includes adjustable reflectors, according to an exemplary embodiment of the invention.

FIG. 6 is a diagram illustrating a system that includes adjustable reflectors, according to an exemplary embodiment of the invention. By way of illustration, FIG. 6 depicts a PV panel 602 and reflectors 604a and 604b. In accordance with the example embodiment depicted in FIG. 6, adjusting the tilt ($\theta$) of reflector 604b (via knob 606 in the FIG. 6 example) can impact the yield of the PV panel 602. The optimum tilt ($\theta$) value can vary throughout a day and across a week, month, and/or year. By way of example, the optimum tilt ($\theta$) value can be within a range of 30° and 110° for maximum energy yield at a given time. Additionally, at the optimum tilt ($\theta$) value, light covers the entire PV panel. In contrast, the tilt ($\theta$) value can be modified to block light from reaching the PV panel. Accordingly, at least one embodiment of the invention can include programming data related to such variance into smart machines that drive motors connected to the reflectors.

Also, in accordance with the example embodiment depicted in FIG. 6, adjusting the length of reflector 604b (via knob 605 in the FIG. 6 example), the energy yield of the PV panel 602 can be further tuned. In such an embodiment, the reflector (604b) can slide up and down so that the size and shadow length can be controlled. For example, in the morning and evening, it may be desired to have smaller reflectors to reduce shadow length, whereas during midday, it may be desired to have longer reflectors.

Figure 7:
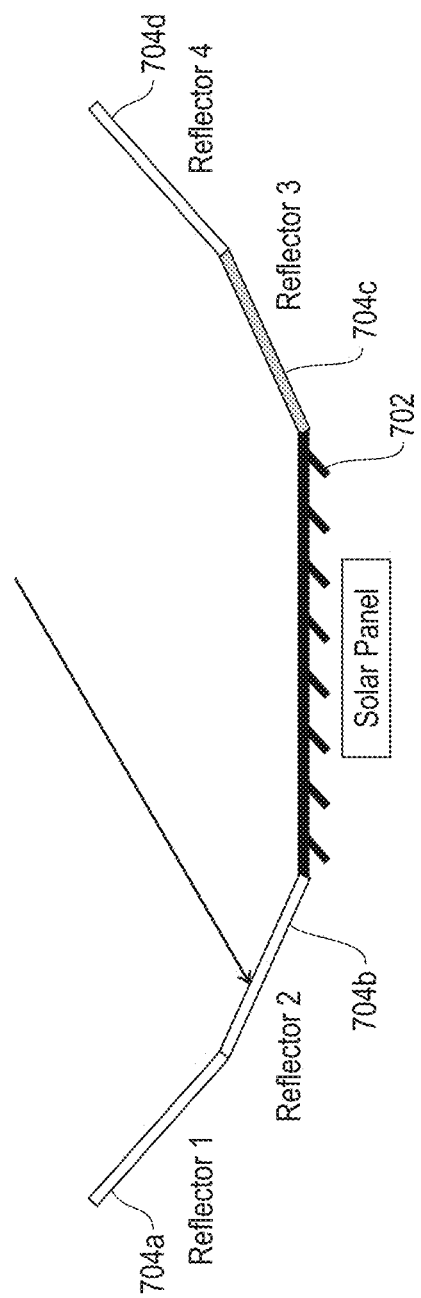
FIG. 7 is a diagram illustrating a system that includes multiple heterogeneous split reflectors, according to an exemplary embodiment of the invention.

FIG. 7 is a diagram illustrating a system that includes multiple heterogeneous split reflectors, according to an exemplary embodiment of the invention. By way of illustration, FIG. 7 depicts a PV (solar) panel 702 and reflectors 704a, 704b, 704c, and 704d. In one or more embodiments of the invention, reflectors on each side of the solar panel can be broken down into multiple segments (for example, reflector segments 704a and 704b on one side of panel 702, and reflector segments 704c and 704d on the other side of panel 702). Each segment can, for example, be a different type of reflector (such as flat, fixed macro-mirrors, micro-end mirrors, macro-mirrors with micro-hemispheres, end-mirrors, waveguide mirrors, etc.). Such an embodiment can be implemented, for example, to maximize the levelized cost of energy, improve supply-demand alignment by managing production at a finer level, and/or maximize the ground coverage ratio, shadow ratio, etc.

Figure 8:
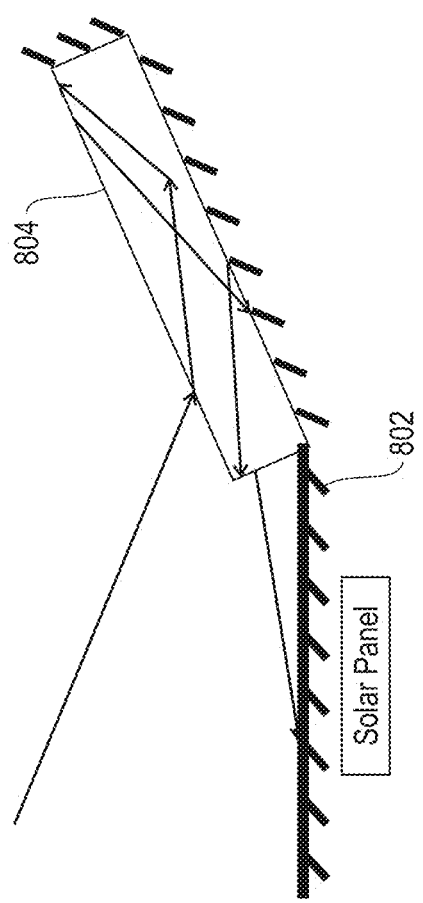
FIG. 8 is a diagram illustrating a system that includes a waveguide mirror, according to an exemplary embodiment of the invention.

FIG. 8 is a diagram illustrating a system that includes a waveguide mirror, according to an exemplary embodiment of the invention. By way of illustration, FIG. 8 depicts a PV (solar) panel 802 and a waveguide mirror 804. The waveguide mirror 804 can include an anti-reflection coating (ARC) on the top surface, as well as at least one rough surface for light trapping and guiding trapped light out uniformly over the surface of the panel (particularly, for example, in the morning and/or afternoon hours). The exit structure of the waveguide mirror 804 can include a flat structure, a concave structure, and/or a prismatic diffuser (such as light emitting diodes (LEDs)). Additionally, a waveguide mirror can be implemented, for example, to minimize absorption of the spectrum within the planar waveguide. Further, light entering the medium is internally reflected back to the panel.

Figure 9:
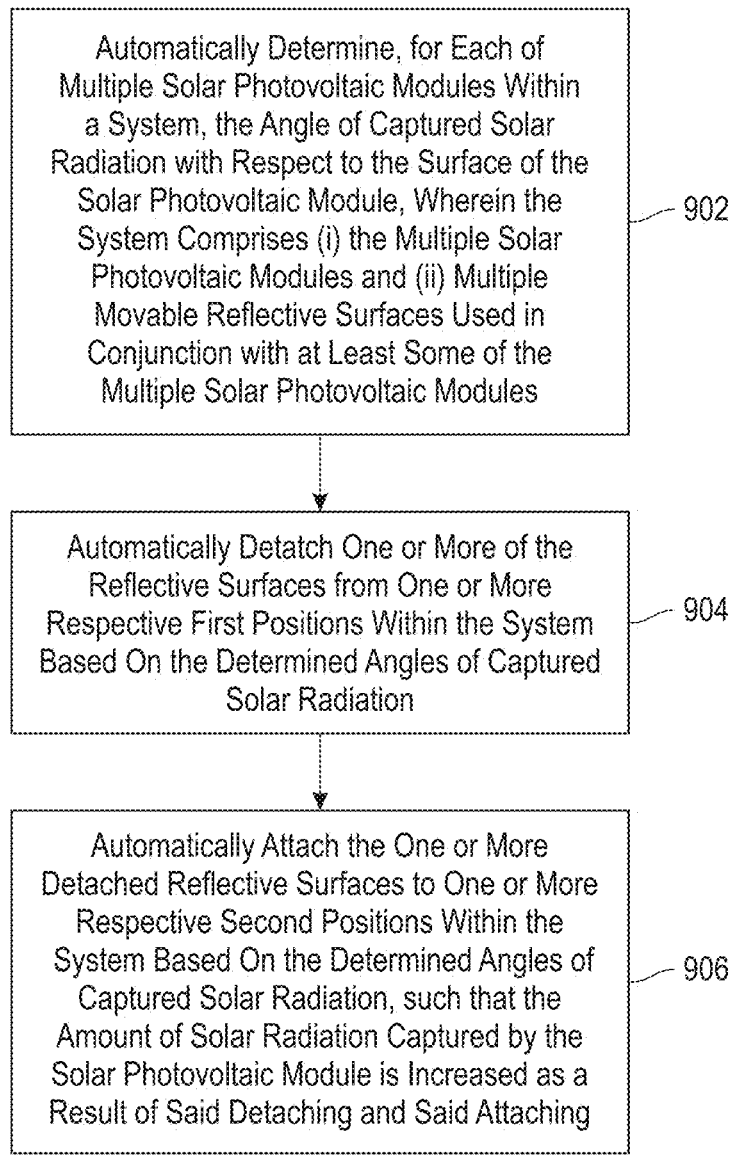
FIG. 9 is a flow diagram illustrating techniques according to an embodiment of the invention.

FIG. 9 is a flow diagram illustrating techniques according to an embodiment of the present invention. Step 902 includes automatically determining, for each of multiple solar photovoltaic modules within a system, the angle of captured solar radiation with respect to the surface of the solar photovoltaic module, wherein the system comprises (i) the multiple solar photovoltaic modules and (ii) multiple moveable reflective surfaces used in conjunction with at least some of the multiple solar photovoltaic modules. In one or more embodiments of the invention, at least one of the moveable reflective surfaces includes multiple reflective surfaces embodied thereon.

Step 904 includes automatically detaching one or more of the reflective surfaces from one or more respective first positions within the system based on the determined angles of captured solar radiation.

Step 906 includes automatically attaching the one or more detached reflective surfaces to one or more respective second positions within the system based on the determined angles of captured solar radiation, such that the amount of solar radiation captured by the solar photovoltaic module is increased as a result of said detaching and said attaching.

Automatically attaching the one or more detached reflective surfaces to one or more respective second positions within the system can also be further based on analysis of one or more items of multi-modal data. The items of multi-modal data can include an amount of debris covering one or more solar photovoltaic module surfaces within the system, temperature of one or more solar photovoltaic module surfaces within the system, and/or detected performance of one or more of the solar photovoltaic modules when the one or more reflective surfaces are located at their second positions.

Additionally, automatically attaching the one or more detached reflective surfaces to one or more respective second positions within the system can be further based on one or more system constraints. The one or more system constraints can include one or more shadowing constraints related to the one or more respective second positions of the one or more reflective surfaces within the system, target solar photovoltaic module profile information, and/or one or more costs associated with said detaching and said attaching the one or more reflective surfaces.

Additionally, as detailed herein, the respective first positions and the respective second positions can correspond to different solar photovoltaic modules. Also, attaching the one or more detached reflective surfaces at the respective second positions can result in the reflective surfaces being oriented at an angle different from the angle of the reflective surfaces at the respective first positions.

The techniques depicted in FIG. 9 can also include reducing the surface temperature of one or more of the solar photovoltaic modules by controlling one or more water inlet valves connected to one or more water canals positioned within a predetermined proximity to the one or more solar photovoltaic modules. In one or more embodiments of the invention, controlling the one or more water inlet valves is based on analysis of temperature data pertaining to the solar photovoltaic modules, production data pertaining to the solar photovoltaic modules, one or more thermal images of one or more of the solar photovoltaic modules, wind speed data relevant to the solar photovoltaic modules, one or more weather forecasts relevant to the solar photovoltaic modules, and water level data pertaining to the one or more water canals.

Figure 10:
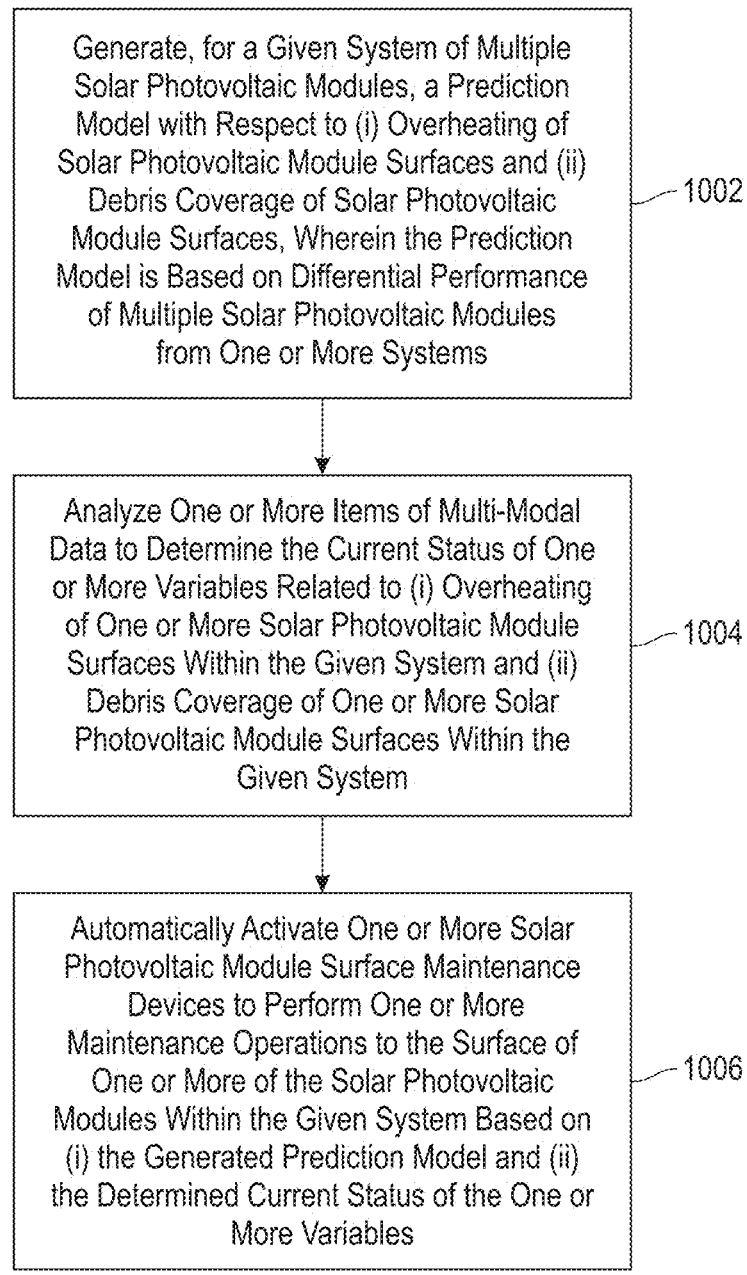
FIG. 10 is a flow diagram illustrating techniques according to an embodiment of the invention.

FIG. 10 is a flow diagram illustrating techniques according to an embodiment of the present invention. Step 1002 includes generating, for a given system of multiple solar photovoltaic modules, a prediction model with respect to (i) overheating of solar photovoltaic module surfaces and (ii) debris coverage of solar photovoltaic module surfaces, wherein the prediction model is based on differential performance of multiple solar photovoltaic modules from one or more systems.

Step 1004 includes analyzing one or more items of multi-modal data to determine the current status of one or more variables related to (i) overheating of one or more solar photovoltaic module surfaces within the given system and (ii) debris coverage of one or more solar photovoltaic module surfaces within the given system.

Step 1006 includes automatically activating one or more solar photovoltaic module surface maintenance devices to perform one or more maintenance operations to the surface of one or more of the solar photovoltaic modules within the given system based on (i) the generated prediction model and (ii) the determined current status of the one or more variables.

In one or more embodiments of the invention, the one or more solar photovoltaic module surface maintenance devices can include one or more water sprinklers. In such an embodiment, the one or more maintenance operations comprise discharging water from one or more of the water sprinklers to the surface of the one or more solar photovoltaic modules. Additionally, in one or more embodiments of the invention, the one or more solar photovoltaic module surface maintenance devices comprise one or more air blowers. In such an embodiment, the one or more maintenance operations comprise discharging forced air from one or more of the air blowers to the surface of the one or more solar photovoltaic modules.

Also, an additional embodiment of the invention includes a system that includes a plurality of solar photovoltaic modules, and a plurality of moveable reflective surfaces that (i) collect solar radiation and (ii) distribute the collected solar radiation across one or more portions of the plurality of solar photovoltaic modules, wherein each one of the plurality of moveable reflective surfaces is physically connected to at least one of the solar photovoltaic modules. Such a system can also include a controller, wherein the controller comprises at least a memory and a processor coupled to the memory, and wherein the controller: automatically determines, for each of the solar photovoltaic modules, the angle of the collected solar radiation with respect to the surface of the solar photovoltaic module; generates instructions for automatically detaching one or more of the reflective surfaces from one or more respective first positions based on the determined angles of collected solar radiation; and generates instructions for automatically attaching the one or more detached reflective surfaces to one or more respective second positions based on the determined angles of captured solar radiation, such that the amount of solar radiation captured by the solar photovoltaic module is increased as a result of said detaching and said attaching.

In one or more embodiments of the invention, such a system can also include one or more water canals positioned proximate to the plurality of solar photovoltaic modules; and one or more input valves connecting the one or more water canals to the plurality of solar photovoltaic modules. In such an embodiment, the controller generates instructions for opening at least one of the one or more input valves to facilitate water to flow onto at least a portion of one or more of the solar photovoltaic modules, wherein the instructions are based on analysis of (i) surface temperature data pertaining to the plurality of solar photovoltaic modules, (ii) production data pertaining to the plurality of solar photovoltaic modules, (iii) one or more thermal images corresponding to the plurality of solar photovoltaic modules, (iv) wind speed data relevant to the plurality of solar photovoltaic modules, (v) one or more weather forecasts relevant to the plurality of solar photovoltaic modules, and (vi) water level data pertaining to the one or more water canals.

Further, yet another embodiment of the invention includes a similar system that can also include one or more air blowers, wherein each one of the air blowers is positioned proximate to the plurality of solar photovoltaic modules, and one or more fluid sprinklers, wherein each one of the fluid sprinklers is positioned proximate to the plurality of solar photovoltaic modules. Such a system also includes a controller, wherein the controller comprises at least a memory and a processor coupled to the memory, and wherein the controller: automatically activates the one or more air blowers to perform one or more maintenance operations to the surface of one or more of the solar photovoltaic modules at one or more determined temporal instances based on (i) a generated prediction model and (ii) a determined current status of the one or more variables; and automatically activates the one or more fluid sprinklers to perform one or more maintenance operations to the surface of one or more of the solar photovoltaic modules at one or more determined temporal instances based on (a) a prediction model with respect to (i) overheating of solar photovoltaic module surfaces and (ii) debris coverage of solar photovoltaic module surfaces, and (b) a current status of one or more variables related to (i) surface overheating of one or more of the solar photovoltaic modules and (ii) debris coverage of one or more of the solar photovoltaic modules.

The techniques depicted in FIG. 9 and FIG. 10 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 9 and FIG. 10 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 11:
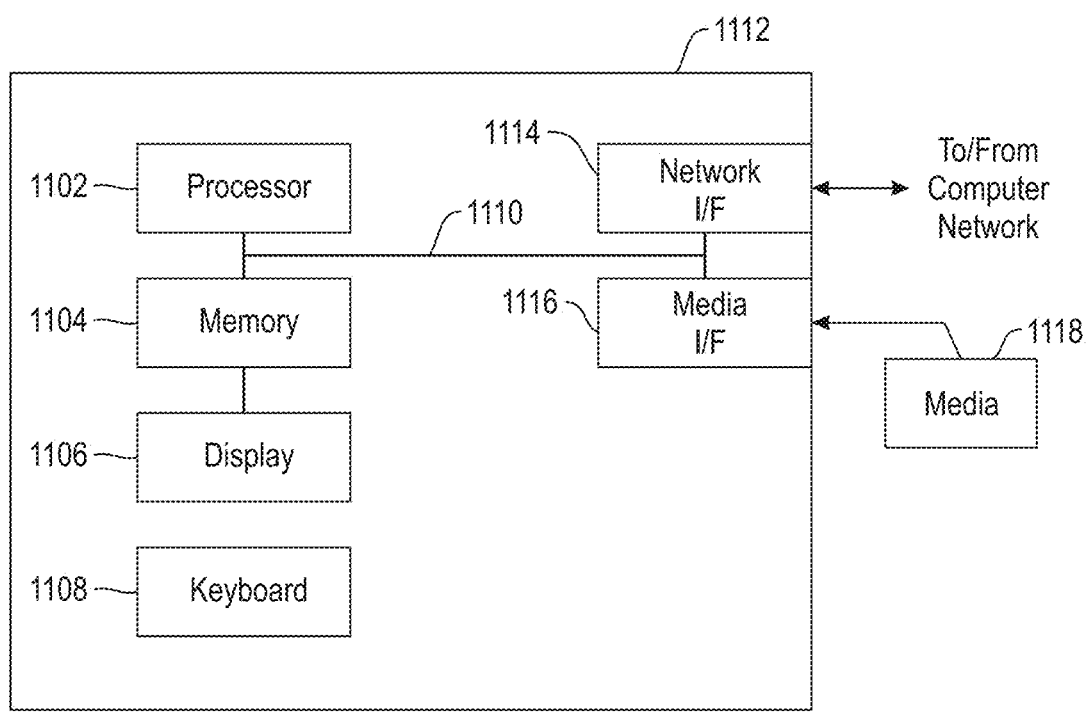
FIG. 11 is a system diagram of an exemplary computer system on which at least one embodiment of the invention can be implemented.

Additionally, an embodiment of the present invention can make use of software running on a computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1102. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
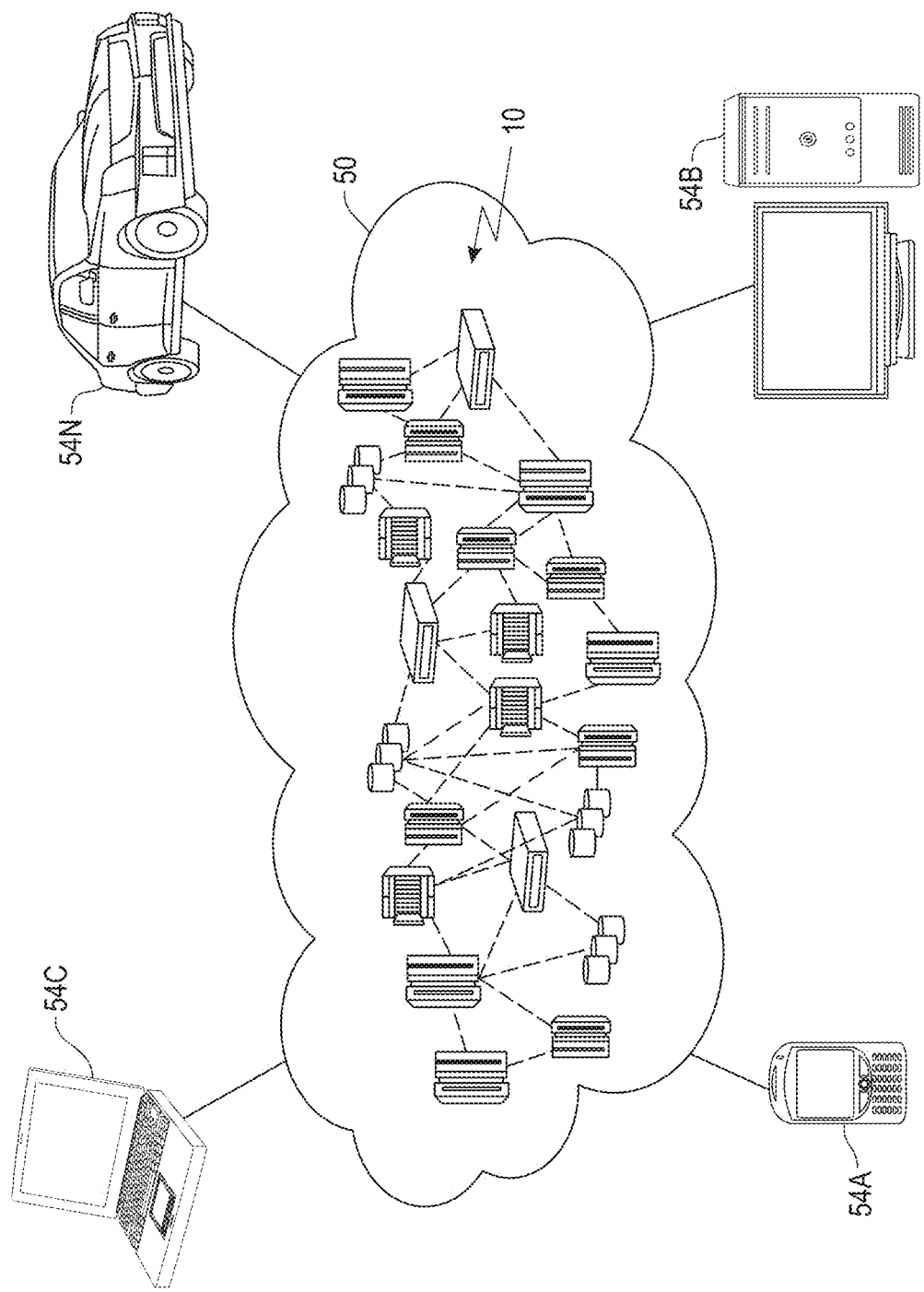
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
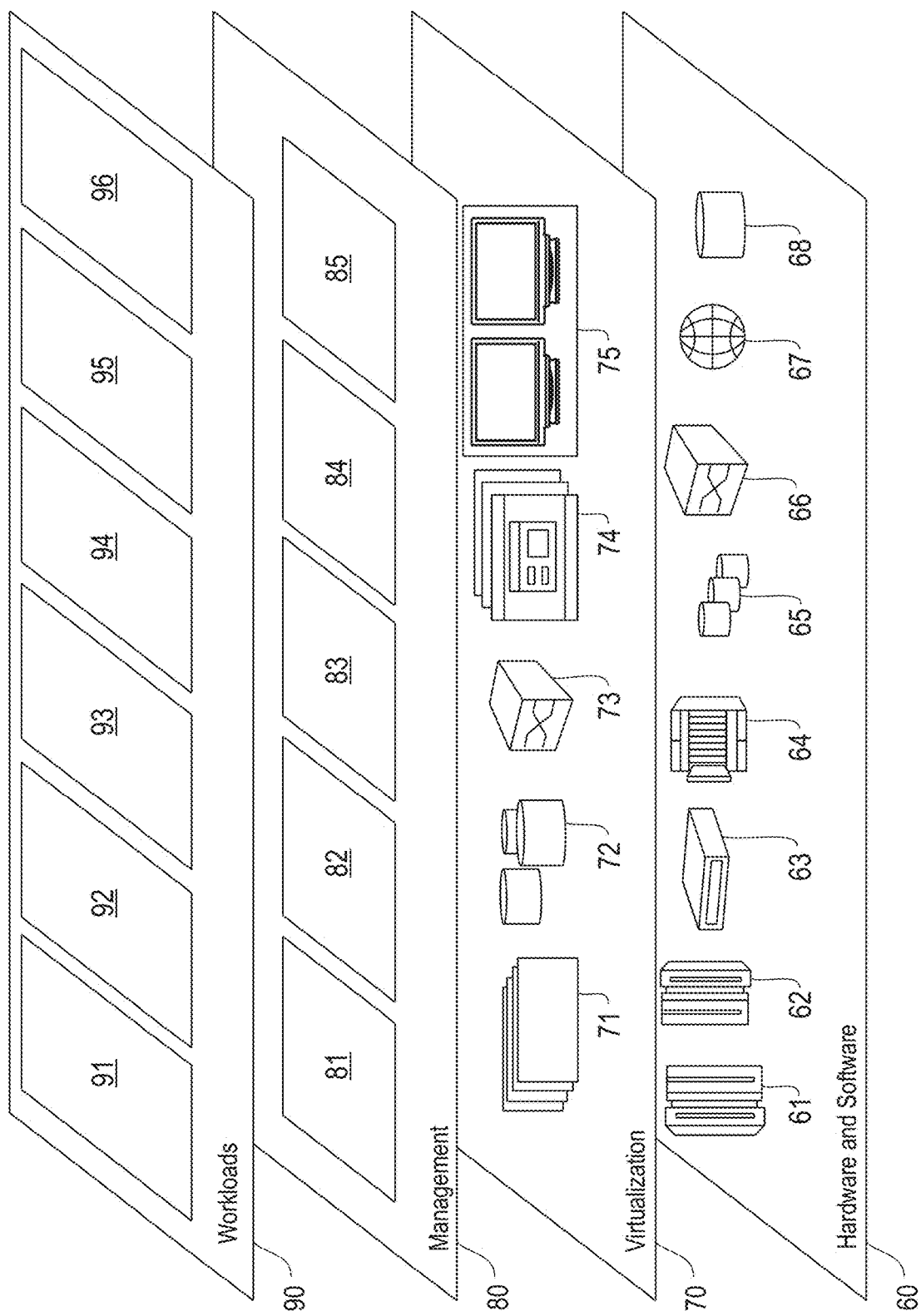
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; control of operations and maintenance of integrated photonic reflectors and solar PV modules 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, utilizing an IoT integrated system for automated maintenance of higher concentration solar farms by selectively activating air-jets and water sprinklers based on analysis of multi-modal inputs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
automatically determining, for each of multiple solar photovoltaic modules within a system, the angle of captured solar radiation with respect to the surface of the solar photovoltaic module, wherein the system comprises (i) the multiple solar photovoltaic modules and (ii) multiple moveable reflective surfaces used in conjunction with at least some of the multiple solar photovoltaic modules;
automatically detaching one or more of the reflective surfaces from one or more respective first positions within the system based on the determined angles of captured solar radiation;
automatically attaching the one or more detached reflective surfaces to one or more respective second positions within the system based on the determined angles of captured solar radiation, such that the amount of solar radiation captured by the solar photovoltaic module is increased as a result of said detaching and said attaching; and reducing the surface temperature of one or more of the solar photovoltaic modules by controlling one or more water inlet valves connected to one or more water canals positioned within a predetermined proximity to the one or more solar photovoltaic modules;

wherein the steps are carried out by at least one computing device.

2. The computer-implemented method of claim 1, wherein said automatically attaching the one or more detached reflective surfaces to one or more respective second positions within the system is further based on analysis of one or more items of multi-modal data.

3. The computer-implemented method of claim 2, wherein the one or more items of multi-modal data comprises an amount of debris covering one or more solar photovoltaic module surfaces within the system.

4. The computer-implemented method of claim 2, wherein the one or more items of multi-modal data comprise a temperature value of one or more solar photovoltaic module surfaces within the system.

5. The computer-implemented method of claim 2, wherein the one or more items of multi-modal data comprise detected performance of one or more of the solar photovoltaic modules when the one or more reflective surfaces are located at their second positions.

6. The computer-implemented method of claim 1, wherein said automatically attaching the one or more detached reflective surfaces to one or more respective second positions within the system is further based on one or more system constraints.

7. The computer-implemented method of claim 6, wherein the one or more system constraints comprise one or more shadowing constraints related to the one or more respective second positions of the one or more reflective surfaces within the system.

8. The computer-implemented method of claim 6, wherein the one or more system constraints comprises target solar photovoltaic module profile information.

9. The computer-implemented method of claim 6, wherein the one or more system constraints comprises one or more costs associated with said detaching and said attaching the one or more reflective surfaces.

10. The computer-implemented method of claim 1, wherein at least one of the moveable reflective surfaces comprises multiple reflective surfaces embodied thereon.

11. The computer-implemented method of claim 1, wherein the respective first positions and the respective second positions correspond to different solar photovoltaic modules.

12. The computer-implemented method of claim 1, wherein said attaching the one or more detached reflective surfaces at the respective second positions results in the reflective surfaces being oriented at an angle different from the angle of the reflective surfaces at the respective first positions.

13. The computer-implemented method of claim 1, wherein said controlling the one or more water inlet valves is based on analysis of temperature data pertaining to the solar photovoltaic modules, production data pertaining to the solar photovoltaic modules, one or more thermal images of one or more of the solar photovoltaic modules, wind speed data relevant to the solar photovoltaic modules, one or more weather forecasts relevant to the solar photovoltaic modules, and water level data pertaining to the one or more water canals.

* * * * *